United States Patent Office 3,004,274
Patented Oct. 17, 1961

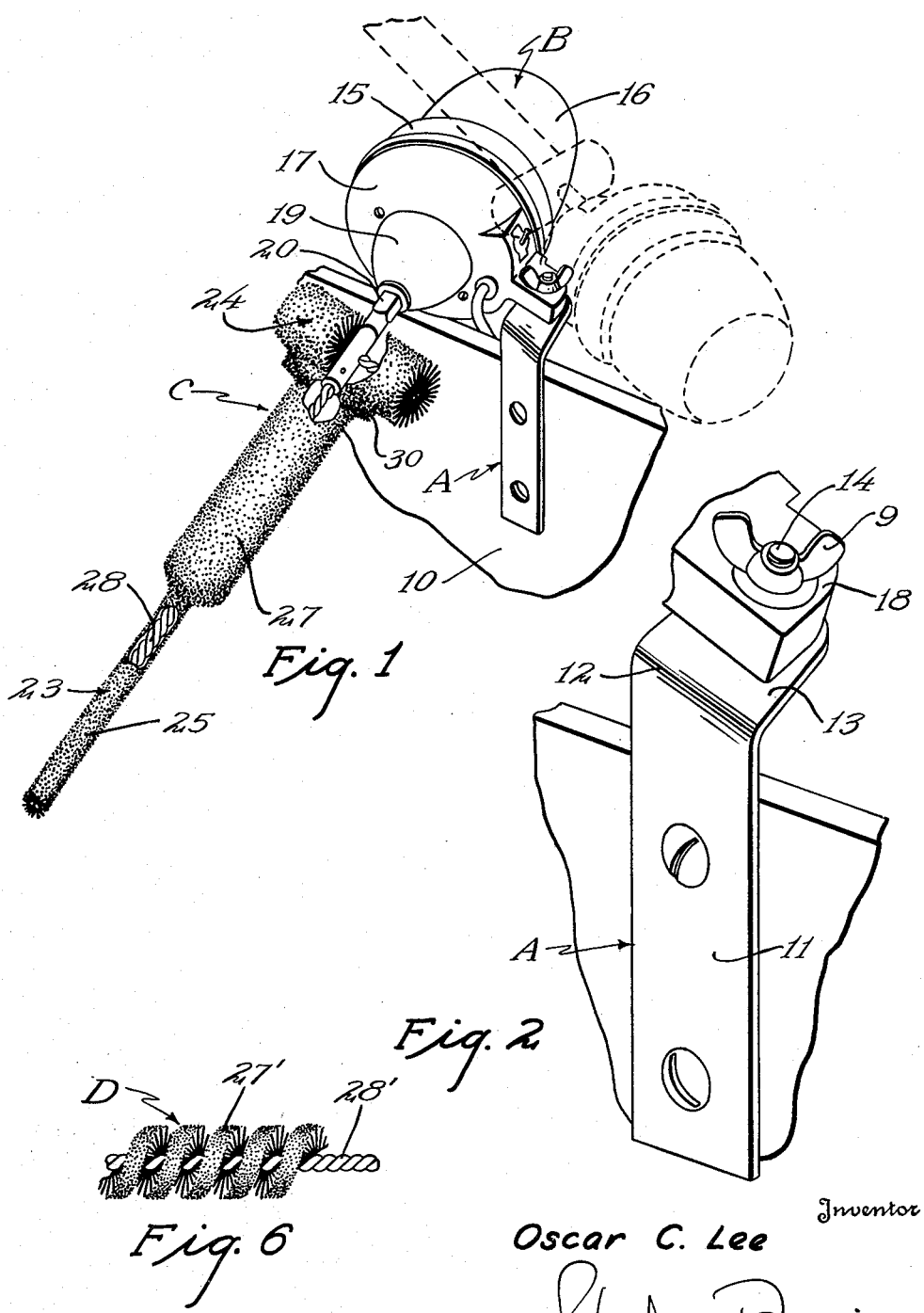

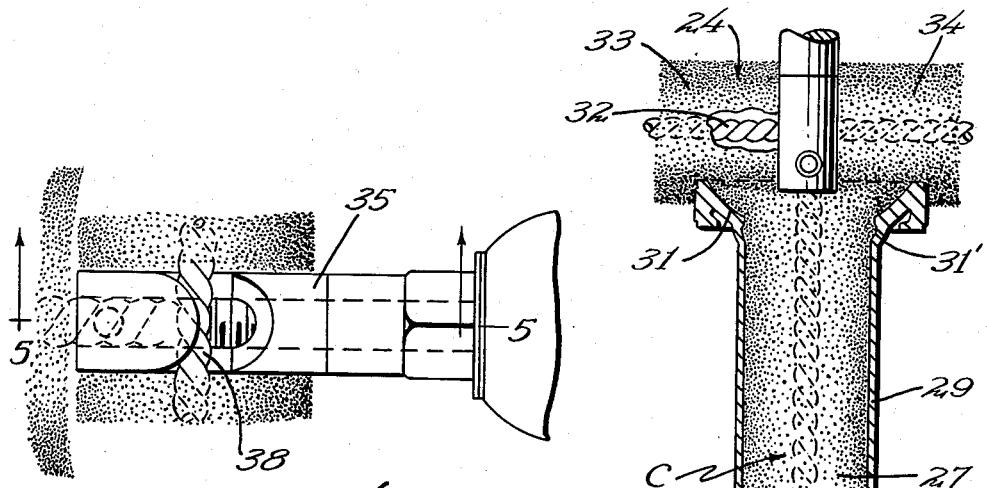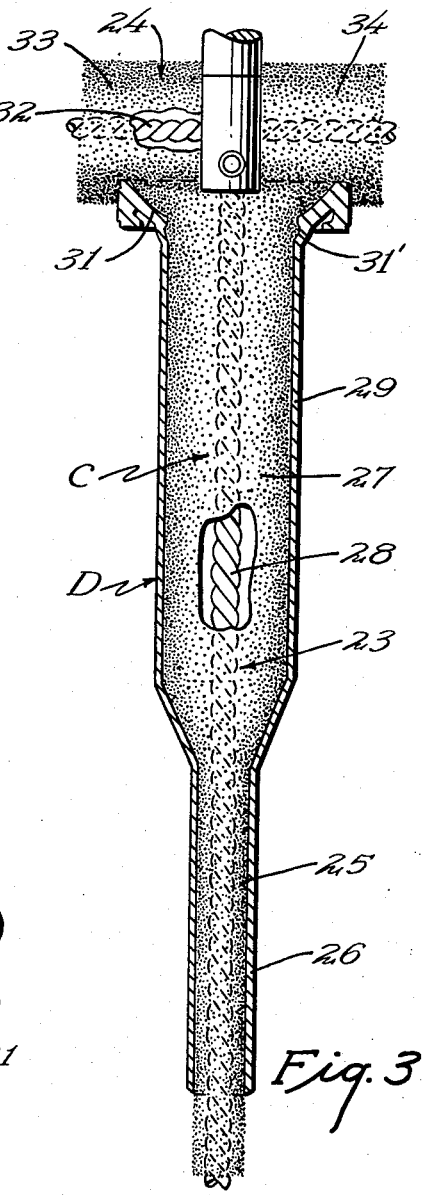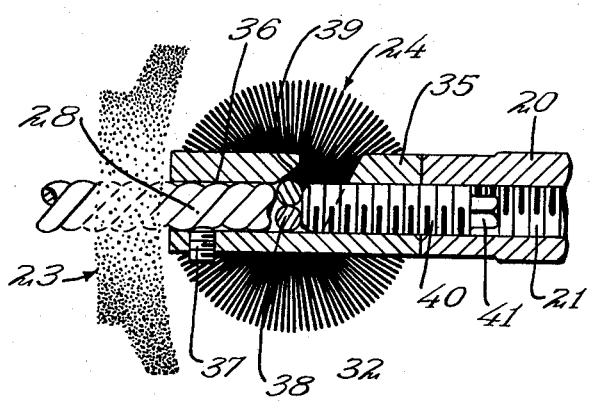
Inventor
Oscar C. Lee
By Robert M. Dunning
ATTORNEY

3,004,274
MILKING MACHINE INFLATION BRUSHES
Oscar C. Lee, River Falls, Wis.
Filed May 7, 1956, Ser. No. 583,054
2 Claims. (Cl. 15—56)

This invention relates to an improvement in milking machine inflation brushes and deals particularly with an apparatus for effectively cleaning the inflations of a milking machine.

The inflations of milking machines are difficult to clean and require considerable time and effort if they are to be maintained in proper condition. Brushes have been provided which are shaped to fit into the inflations and to remove deposits therefrom. However, these brushes must be manually rotated and, as a result, the inflations are usually not cleaned to the proper degree. As a result a coating of deposit gradually builds up on the walls of the inflations making it necessary to replace these elements at frequent intervals.

A feature of the present invention resides in the provision of a revolving brush mounted on an electrical motor and rotated thereby. As a result the inflations may be placed over the brush and thoroughly scrubbed and cleaned with a minimum of effort. A few seconds' time cleaning each inflation with this motor driven brush are the equivalent of several minutes of manual cleaning. As a result it has been found that the building up of deposit on the inflations is prevented and the inflations have actually been used without replacement four times as long as was customary before the present device was employed.

A feature of the present invention resides in the provision of an inflation brush including a longitudinally extending brush designed to extend axially into the inflation and a transverse brush secured transversely of the longitudinal shaft for cleaning the entrance end of the inflation. Both brushes are rotated simultaneously, one portion rotating about its axis and the other rotating in a plane including the axis.

A feature of the present invention resides in the provision of a simple and effective clamp for holding the two brushes in substantially right angular relation. The structure includes a socket designed to accommodate the axis of one of the brushes and includes a notch designed to accommodate the second brush in a position to intersect the axis of the first brush. A simple and effective means is provided for holding the brushes in proper relation.

A further feature of the present invention resides in the provision of a brush supported by a motor which, in turn, is supported by a suitable supporting bracket to the washing tank in which the milking apparatus is cleaned. The bracket supports the motor so that the longitudinal portion may incline downwardly into the tank or may incline upwardly at an upward angle from the bracket when not in use.

These and other objects and novel features of my invention will be more clearly and fully set forth in the following specification and claims.

In the drawings forming a part of the specification:

FIGURE 1 is a perspective view showing the milking machine inflation brush in position upon the wall of a milking tank;

FIGURE 2 is a perspective view of the motor support ing bracket;

FIGURE 3 is a sectional view through a milking machine inflation showing the brush in position therein;

FIGURE 4 is a detailed view of the clamp for connecting the brushes to the motor shaft;

FIGURE 5 is a sectional view longitudinally through the connector clamp shown in FIGURE 4, the position of the section being indicated by the line 5—5 of FIGURE 4; and FIGURE 6 illustrates a partial brush structure in more specific detail.

The general assembly is best illustrated in FIGURE 1 of the drawings. The figure illustrates diagrammatically a wall 10 of a washing tank of the type normally used to wash the milking machine equipment. A bracket illustrated in general by the letter A is mounted upon the wall 10. The bracket A acts to support a motor which is illustrated in general by the letter B. The motor B, in turn, supports the inflation brush assembly which is indicated in general by the letter C.

The bracket A is formed as is best illustrated in FIGURES 1 and 2 of the drawings. A strip 11 of stainless steel or the like is bent angularly at 12, the line of bending being at an acute angle to the horizontal. The bracket terminates in an outwardly turned extremity 13 which is arranged on a plane which is at an acute angle to a horizontal plane. The extremity 13 is apertured to accommodate the head end of a clamping bolt 14 which acts both as a pivot and as a clamp.

The motor B includes a generally cylindrical housing portion 15 which connects with a dome-shaped housing portion 16 designed to enclose the operating portions of the motor. The housing also includes a dish-shaped housing portion 17 connected to the cylindrical portion 15. A cup-shaped center portion 19 is provided on the portion 17 and axially of the housing. A motor shaft 20 is sealed with respect to the housing portion 19 and projects axially therefrom. This motor shaft 20, as is illustrated in FIGURE 5 of the drawings, includes an axial internally threaded socket 21.

The motor B includes a radially extending supporting lug 18 which is apertured to accommodate the clamping bolt 14. This lug 18 is designed to rest upon the upper surface of the bracket extremity 13. The clamp bolt 14 extends both through the extremity 13 and the lug 18 and a wing nut 9 may be tightened to clamp the motor in a desired angle relative to the bracket.

The purpose of this arrangement is to so support the motor that its drive shaft 20 may incline downwardly into the interior of the tank 10 or may incline upwardly and along the edge of the tank. When the motor is swung through slightly more than ninety degrees, the motor shaft begins to incline downwardly and toward the bottom of the tank 10. When swung in the opposite direction, the motor shaft is inclined upwardly. This is to permit the cleaning of other portions of the milking machine equipment without interference by the motor and its brush. When the inflations are being cleaned the motor may be inclined downwardly and into the tank so that the inflations and tubes to which they are connected may be lifted upwardly from the bottom of the tank and inserted over the brush with a minimum of difficulty.

The brush C is best illustrated in FIGURES 1 and 3 to 5. The brush C includes a longitudinal brush portion 23 and a transverse brush portion 24, the two portions being arranged in the form of a T with the transverse brush intersecting the axis of the longitudinal brush 23. The brush 23 is preferably formed of bristles clamped between a pair of spirally wound wires, the wire core being indicated at 28. The brush includes an end portion 25 where the bristles are relatively short, forming a brush of proper diameter to fit the tubular extremity 26 of the milking machine inflation D. The brush also includes a portion 27 of larger diameter to fit within the larger diameter portion 29 of the inflation D. At its extremity the brush is provided with a bristle portion 30 of still larger diameter, the bristle portion 30 being designed to clean any irregular interior of the end 31 of any type of inflation D such as at 31'. The brush 24 is also provided with a center core 32 of spirally twisted wires and includes bristle portions 33 and 34 mounted, for example, at a center base portion 38 of the center core 32. The brush portions 33 and 34 are either generally cylindrical or may be tapered to fit the lateral shape and contours of the inlet upper end 31 of the inflation D. The entry of the brush 24 into the lateral or oblique portions of the outer inlet end 31 is an essential critical working relation therebetween which is a most important feature in my new and improved structure and method of cleaning milking machine inflations. The brush structure of FIGURE 6 illustrates a preferred specific spiral bristle 27' mounted on the wire core 28'.

The two brushes are held in proper relation by a connector 35, best illustrated in FIGURES 4 and 5 of the drawings. The connector 35 comprises a tubular body having a socket 36 at one end designed to accommodate the end of the core 28 of the brush 23. Angularly spaced set screws 37 engage the brush core 28 to hold the core from rotation relative to the connector.

The connector 35 includes a diagonal slot or notch 39 which intersects the socket 36 and is inclined toward the end of the connector into which the core 28 extends. The interior of the other end of the connector 35 is internally threaded to accommodate a set screw 40. This set screw 40 is provided with a socketed head or with a multi-sided head 41 by means of which the set screw 40 may be tightened against the base portion 38 of the core 32 of the brush 24. Thus, the center portion of the brush may be clamped against the end of the notch 39 by this set screw to hold the brush 24 at right angles to the axis of the connector.

As was previously described, the motor shaft 20 is socketed and internally threaded to receive the set screw 40. The brush may, therefore, be threaded into the socket 21 and held in axial alignment with the motor B.

The operation of the apparatus is believed obvious from the foregoing description. The two brushes are mounted, as described, to project from the motor shaft and the motor is preferably supported by the bracket A secured substantially vertically to the inner surface of the tank wall 10. When used, the motor is locked with its brush end inclining downwardly into the tank. Each inflation is then cleaned by rotating the brush C by means of the motor B, the longitudinal brush cleaning the interior of the inflation and the transverse brush cleaning the inlet end of the inflation.

It has been found that only a few seconds operation is required to thoroughly clean the inflation. In the past, where manual operation of a brush was required, the attendant normally did not operate the brush in each inflation a sufficient time to thoroughly clean them. As most milking machines have several units, each including a plurality of inflations, and as it is often necessary to clean the entire equipment at least twice a day after the milking of a herd of cows, the manual labor and time required to clean the inflation was excessive. As a result a coating of deposit normally built up on the inner walls of the inflation until replacement was required. As an example, the inflations are often changed every three months. With the present device, inflations removed after a year's service appear as effective and as operable as when they were put into use.

The brushes may be removed and cleaned after the milking operation is completed. Only a fraction of the time normally required to clean the inflations is used and a much better job results.

In accordance with the patent statutes, I have described the principles of construction and operation of my milking machine inflation brush, and while I have endeavored to set forth the best embodiment thereof, I desire to have it understood that obvious changes may be made within the scope of the following claims without departing from the spirit of my invention.

I claim:

1. An apparatus for cleaning milking machine inflations including an elongated brush including a central core of spirally wound wires and bristles projecting in a generally radial direction therefrom, said elongated brush being shaped to fit into the milking machine inflations, and a transverse brush extending transversely of the elongated brush and at substantially right angles thereto, said last named brush having bristles on the side thereof toward said first named elongated brush, a motor, connecting means having an axial socket for accommodating an end of the core of the elongated brush and having a notch designed to accommodate the center portion of the transverse brush, means for holding said transverse brush clamped in said notch, and means for connecting said connecting means to said motor.

2. An apparatus for cleaning milking machine inflations including an elongated brush including a central core of spirally wound wires and bristles projecting in a generally radial direction therefrom, said elongated brush being shaped to fit into the milking machine inflations, and a transverse brush extending transversely of the elongated brush and at substantially right angles thereto, said last named brush having bristles on the side thereof toward said first named elongated brush, a motor, connecting means having a socketed end designed to accommodate an end of said elongated brush, said connecting means also including an inclined notch inclined toward said socketed end of said connecting means, said connecting means also including clamping means for clamping the center portion of said tranverse brush against the bottom of said notch, and means connecting said connecting means to said motor.

References Cited in the file of this patent
UNITED STATES PATENTS

| | | |
|---|---|---|
| 630,843 | Barbero | Aug. 15, 1899 |
| 881,743 | Thompson | Mar. 10, 1908 |
| 1,317,523 | Meyer | Sept. 30, 1919 |
| 1,371,267 | Shelton | Mar. 15, 1921 |
| 1,539,984 | Wolf | June 2, 1925 |
| 1,564,388 | Westvig | Dec. 8, 1925 |
| 1,578,653 | Gallagher | Mar. 30, 1926 |
| 1,684,631 | Lapinoja | Sept. 18, 1928 |
| 1,703,099 | Craddock | Feb. 26, 1929 |
| 2,615,619 | Anderson | Oct. 28, 1952 |